United States Patent [19]

Tsutumi

[11] Patent Number: 5,336,408
[45] Date of Patent: Aug. 9, 1994

[54] APPARATUS FOR SEPARATING PARTICLES FROM A FLUID STREAM

[75] Inventor: Masataka Tsutumi, Canton, Ohio

[73] Assignee: Sizetec, Inc., Canton, Ohio

[21] Appl. No.: 38,611

[22] Filed: Mar. 29, 1993

[51] Int. Cl.$^5$ .............................. B01D 33/03
[52] U.S. Cl. .................... 210/384; 210/499; 209/405; 209/452; 209/461
[58] Field of Search ............ 209/405, 452, 461; 55/DIG. 31; 210/384, 499

[56] References Cited

U.S. PATENT DOCUMENTS

| | | |
|---|---|---|
| 419,113 | 1/1890 | Salmon . |
| 2,053,895 | 9/1936 | Burmeister . |
| 2,628,718 | 2/1953 | Dockins . |
| 2,819,796 | 1/1958 | Edwards . |
| 3,666,095 | 5/1972 | Krynock et al. . |
| 3,703,236 | 11/1972 | Spurlin et al. . |
| 4,062,768 | 12/1977 | Elliot . |
| 4,082,657 | 4/1978 | Gage . |
| 4,107,035 | 8/1978 | Foresman . |
| 4,146,483 | 3/1979 | Lee ........................ 210/384 |
| 4,199,456 | 4/1980 | Chessman ................ 210/232 |
| 4,351,719 | 9/1982 | Morey . |
| 4,482,455 | 11/1984 | Humphrey . |
| 4,576,713 | 3/1986 | Melin . |
| 4,744,898 | 5/1988 | Bailey ........................ 209/403 |
| 4,906,356 | 3/1990 | Musschoot . |
| 5,028,324 | 7/1991 | Teinert ........................ 210/499 |
| 5,031,845 | 7/1991 | Gemsjager . |

FOREIGN PATENT DOCUMENTS

| | | |
|---|---|---|
| 0155180 | 9/1985 | European Pat. Off. . |
| 0609277 | 3/1935 | Fed. Rep. of Germany . |
| 2749592 | 5/1979 | Fed. Rep. of Germany . |
| 3043497 | 6/1982 | Fed. Rep. of Germany . |
| 3109319 | 9/1982 | Fed. Rep. of Germany . |
| 1300968 | 7/1962 | France . |
| 0556694 | 12/1974 | Switzerland . |
| 1025462 | 6/1983 | U.S.S.R. . |
| 2048723 | 12/1980 | United Kingdom . |
| 2078554 | 1/1982 | United Kingdom . |

Primary Examiner—Robert A. Dawson
Assistant Examiner—W. L. Walker
Attorney, Agent, or Firm—Hudak & Shunk Co.

[57] ABSTRACT

An apparatus for separating coarse particles from a fluid or wet stream, optionally containing fine particles, includes a frame, a screen box, means attached to the frame and to the screen box for movably suspending the screen box on the frame for vibratory motion, a pair of opposing screens which are mounted in the screen box and which allow liquids and fine particles to pass through to the bottom of the screen box to separate discharge openings associated with each screen and allows coarse particles to pass over each screen and onto a single centrally positioned discharge chute, and motor means attached to the screen box for vibrating the screen box and screens mounted thereto. The apparatus can be used for such separation operations as dewatering, desliming and wet scalping, and is especially useful for applications wherein the oversize or coarse particles constitute a major portion of the total feed.

20 Claims, 3 Drawing Sheets

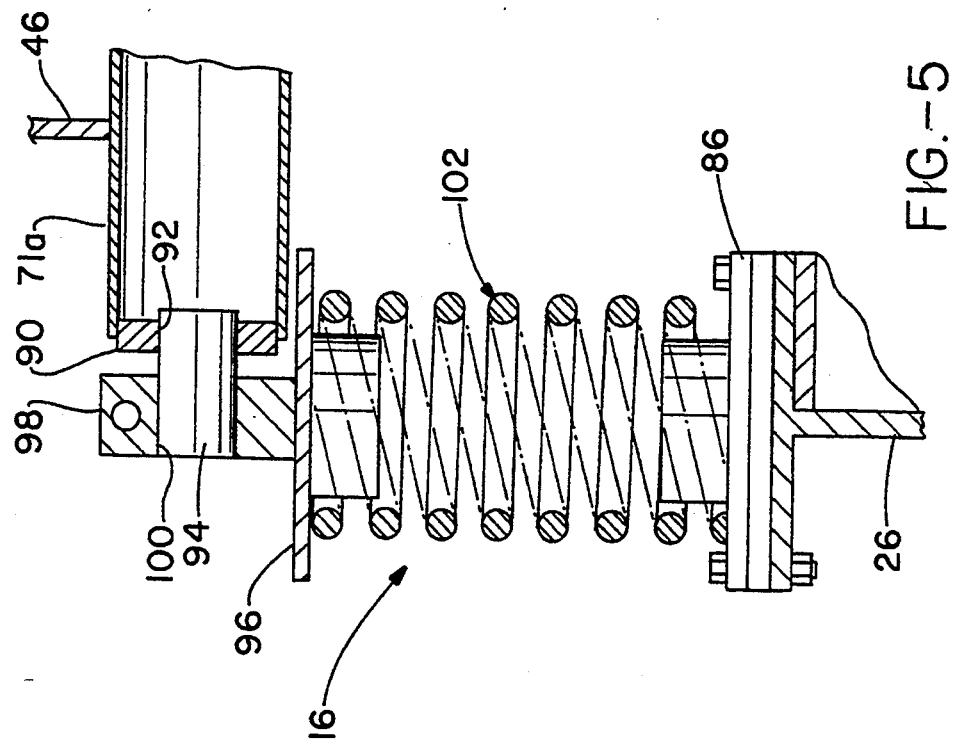
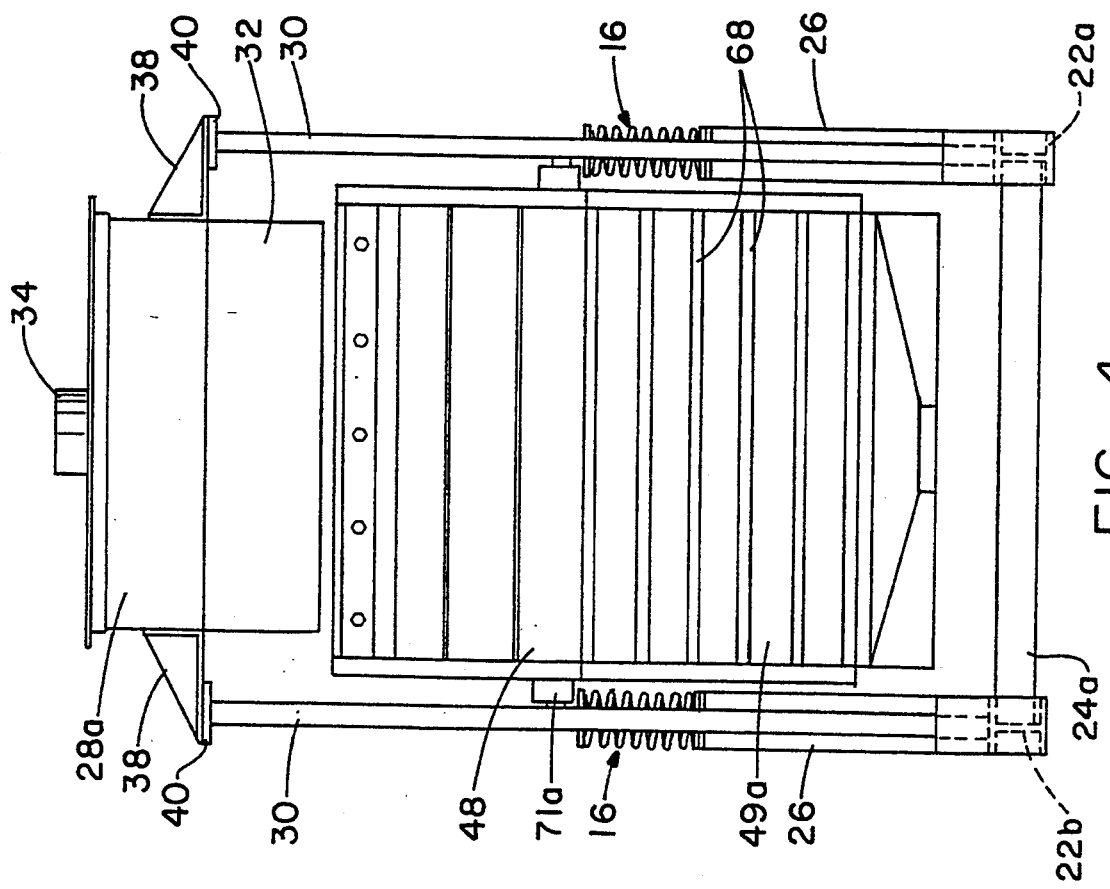

APPARATUS FOR SEPARATING PARTICLES FROM A FLUID STREAM

FIELD OF THE INVENTION

The invention relates generally to apparatus for separating coarse solids from a liquid or slurry, and particularly to screening apparatus suitable for wet sizing, desliming, dewatering and the like. Specifically, the invention pertains to screening apparatus for recovering or removing coarse or oversize particles from a liquid or wet stream, wherein motorized vibration means are utilized to achieve greater separation efficiency.

BACKGROUND

Conventional apparatus utilizing vibrating screens for the separation of oversize particles from a liquid or wet feed stream generally include a stand, a frame movably suspended on the stand, one or more sequentially arranged screens having a total length of approximately eight feet mounted on the frame, and one or more motors mounted on the frame for vibrating the frame and attached screen. A material is deposited on the upper end of the vibrating screen or screens, which sizes and separates the oversize particles from the liquid and any undersize particles as it moves down the screen. The material is usually dropped onto the screens at approximately a right angle to the screen surface. Equipment of the type intended for separating oversize particles from a liquid or wet stream generally have a single feed and a single, or single series of cascading, planar wire cloth screens. Examples of such apparatus are described in U.S. Pat. Nos. 3,666,095 and 4,082,657 to Krynock et al. and Gage, respectively.

While conventional apparatus for separating oversize particles from a fluid or wet streams are suitable for many applications, it has been determined that for a variety of applications adequate separation can be accomplished without using the entire length of the screen or screens, since the desired separation efficiency can often be achieved by the time the material has traveled only a fraction, such as less than half, of the total length of the screen or screens. Accordingly, for many of these applications it would be highly desirable to utilize equipment of a more compact and efficient design which provides greater capacity and/or reduced equipment size. Moreover, it would be desirable to provide an apparatus for separating oversize particles from fluid or wet streams in which greater capacity and separation efficiency is achieved per unit length of the screen while providing for a single overflow discharge. Thus, although the conventional apparatus for separating oversize particles from a fluid stream often provide adequate separation for many applications, higher separation efficiency and material handling capacity for a given size of apparatus are desirable.

The conventional apparatus also have disadvantages associated with the use of wire cloth screens. In particular, cloth screens are very susceptible to wear and damage, and tend to stretch during use. Because of their susceptibility to wear and damage, frequent replacement of the screens, which is usually cumbersome and time consuming, often requires that the separation device be shut down for extended periods. Because, cloth screens tend to stretch during use, frequent adjustment of the tension on the edges of the screen is usually required or, alternatively, special means are required for maintaining adequate tension on the cloth to eliminate wrinkles, unevenness and other surface irregularities which would otherwise produce early failure of the cloth screen under the vibrating action and/or reduce separation efficiency. Accordingly, screening apparatus for separating coarse or oversize particles from a fluid or wet feed stream which utilizes a more durable screen design having an improved operating life would be highly desirable. In addition to requiring frequent replacement, cloth screens are difficult to replace as great care must be exercised during installation to ensure that the screen is free of wrinkles or unevenness. Accordingly, a more durable screen which is easy to replace is highly desirable.

Further, it would also be desirable to provide a design for a vibrating screen separating apparatus wherein the material to be separated approaches the screen surface in a direction more nearly parallel to the longitudinal plane of the screen in order to improve separation efficiency.

Therefore, the need exists for an improved wet sizing apparatus for separating oversize particles from a fluid or wet stream, which achieves improved separation efficiency, higher material handling capacity per unit length of screen while providing for a single overflow discharge, more durable, wear resistant screens, and reduced shut down time.

SUMMARY OF THE INVENTION

The present invention provides an improved wet screening apparatus suitable for separating coarse or oversize particles from a fluid or wet stream optionally containing fine or undersize particles and is generally useful for such separation operations as dewatering, desliming and wet scalping.

The apparatus includes a frame, a screen box, a pair of opposing screens which are mounted in the screen box and which allow liquids and fine particles to pass through and allow coarse particles to pass over, with the screens generally directing the coarse particles away from opposite ends of the screen box and downwardly toward a central portion near the bottom of the screen box, means attached to the frame and to the screen box for movably suspending the screen box on the frame for vibratory motion, and motor means attached to the screen box for vibrating the screen box and screens mounted thereto. The apparatus is provided with a pair of feed boxes which are attached at opposite ends of the frame. Each of the feed boxes is associated with a corresponding screen and discharges material to be separated onto the corresponding screen at a portion thereof near the top of the screen box.

A single overflow discharge at the central region near the bottom of the screen box receives the overflow particles from each of the two screens. The apparatus of the invention thereby achieves increased capacity and efficiency in a compact design which uses a single motor means for vibrating a pair of separate nonsequential, noncascading screens, while maintaining a single oversize discharge whereby material handling is simplified. The advantages of a single oversize discharge for the coarse particles is especially acute in those situations where the oversize particles constitute a predominant or major portion of the total feed. For example, in those cases where the oversize particles are continuously removed for subsequent use, processing or disposal, the number and/or at least the length of conveyance means such as conveyor belts can be reduced, thereby reducing set-up, operation and maintenance costs.

A pair of undersize discharge ports, one associated with each of the screens is provided at the bottom of the screen box on either side of the central oversize discharge. Because the undersize discharge is generally comprised of a liquid optionally containing fine particles, it is highly flowable and generally can be more easily handled than the oversize particle discharge. For instance, the two undersize discharge ports can be easily piped together in a compact, inexpensive manner to form a single undersize discharge.

In accordance with a preferred aspect of the invention, the screens are each generally arcuate and have a generally continuously decreasing slope moving from the leading end of each screen, near the top of the screen at the central region near the bottom of the screen box. That is, the material preferably initially contacts the screen at a steeply downward sloping portion of the screen and continuously moves towards portions of the screen having a progressively decreasing slope. The steep slope at the initial portions of the screen allows for the quick efficient removal of the majority of liquid early on, with the bottom more gradually sloped portions of the screen serving to remove the majority of the fine undersize particles.

The initial slope of the screen is preferably very high so that feed material deposited by gravity or dropped onto the screens from the feed boxes approaches the surface of each screen in a direction nearly parallel to the longitudinal plane of the screen to improve separation efficiency. Because the feed generally flows directly downward from the feed box, the initial portion of the screen is preferably nearly vertical.

In accordance with another preferred aspect of the invention, the screens are composed of a relatively rigid metal grating having a very high modulus of elasticity and a very high tensile strength so as to provide improved wear and damage resistance as compared with cloth screens, and to facilitate easy installation and replacement by dispensing with the need to exercise care to avoid wrinkles and unevenness. Because rigid metal screens having a suitable strength and modulus are not susceptible to stretching or wrinkling, there is no need to make frequent or any adjustments during normal operation to maintain tension on the edges of the screen. Likewise, the need for special means for maintaining adequate tension on the edges of the screen is eliminated. The metal screens preferably used with the invention do not require replacement as frequently as do cloth screen and can be replaced more easily than cloth screen. Accordingly, shut down time for service, maintenance and replacement of the preferred metal screens of the invention is substantially reduced as compared to conventional apparatus utilizing cloth screens.

To further facilitate ease of replacement of the screens, the lateral sides of the screen box of the apparatus are preferably provided with a plurality of access openings which allow fasteners used to attach the screens to the screen box to be easily removed by maintenance personnel.

BRIEF DESCRIPTION OF THE DRAWINGS

FIG. 4 is an elevational side view of the apparatus; and

FIG. 5 is an enlarged fragmentary sectional view along lines 5—5 of FIG. 3 showing one of the suspension assemblies of the apparatus.

DESCRIPTION OF THE PREFERRED EMBODIMENT

Figure 1:
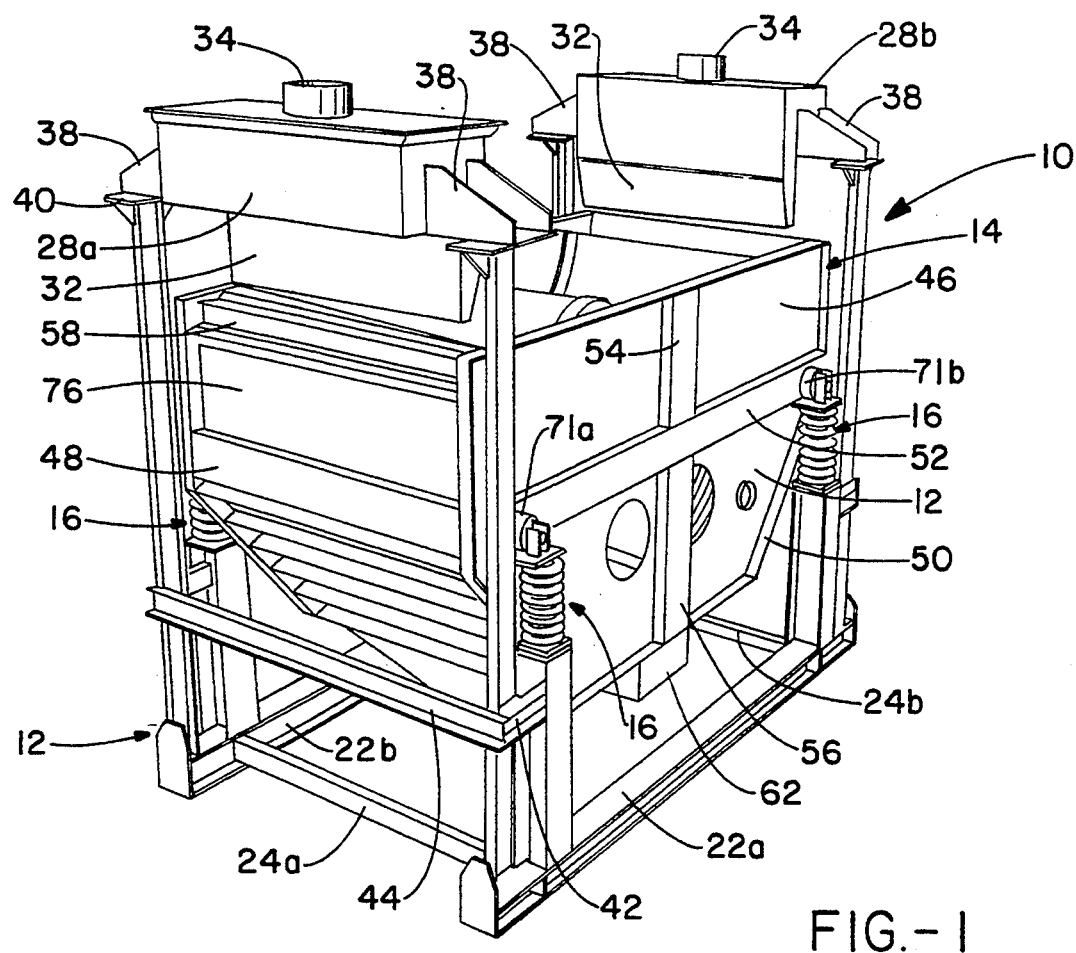
FIG. 1 is a perspective view of the wet screening apparatus of the invention.
Figure 2:
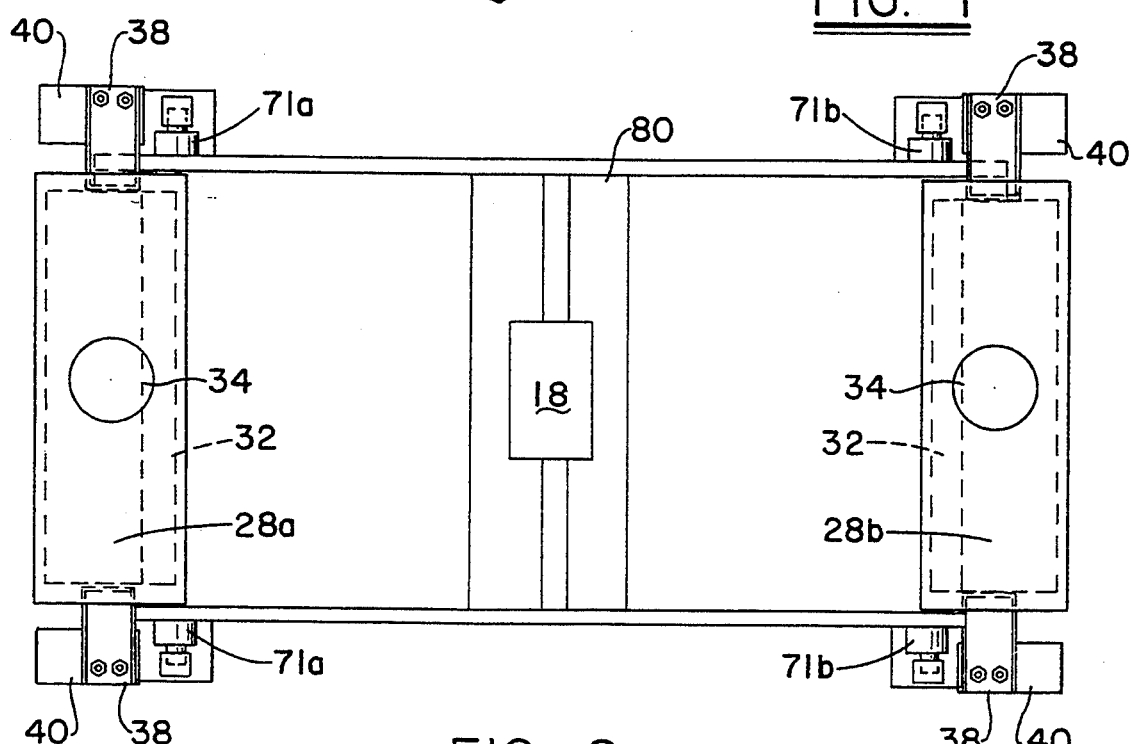
FIG. 2 is a top plan view of the apparatus shown in FIG. 1.
Figure 3:
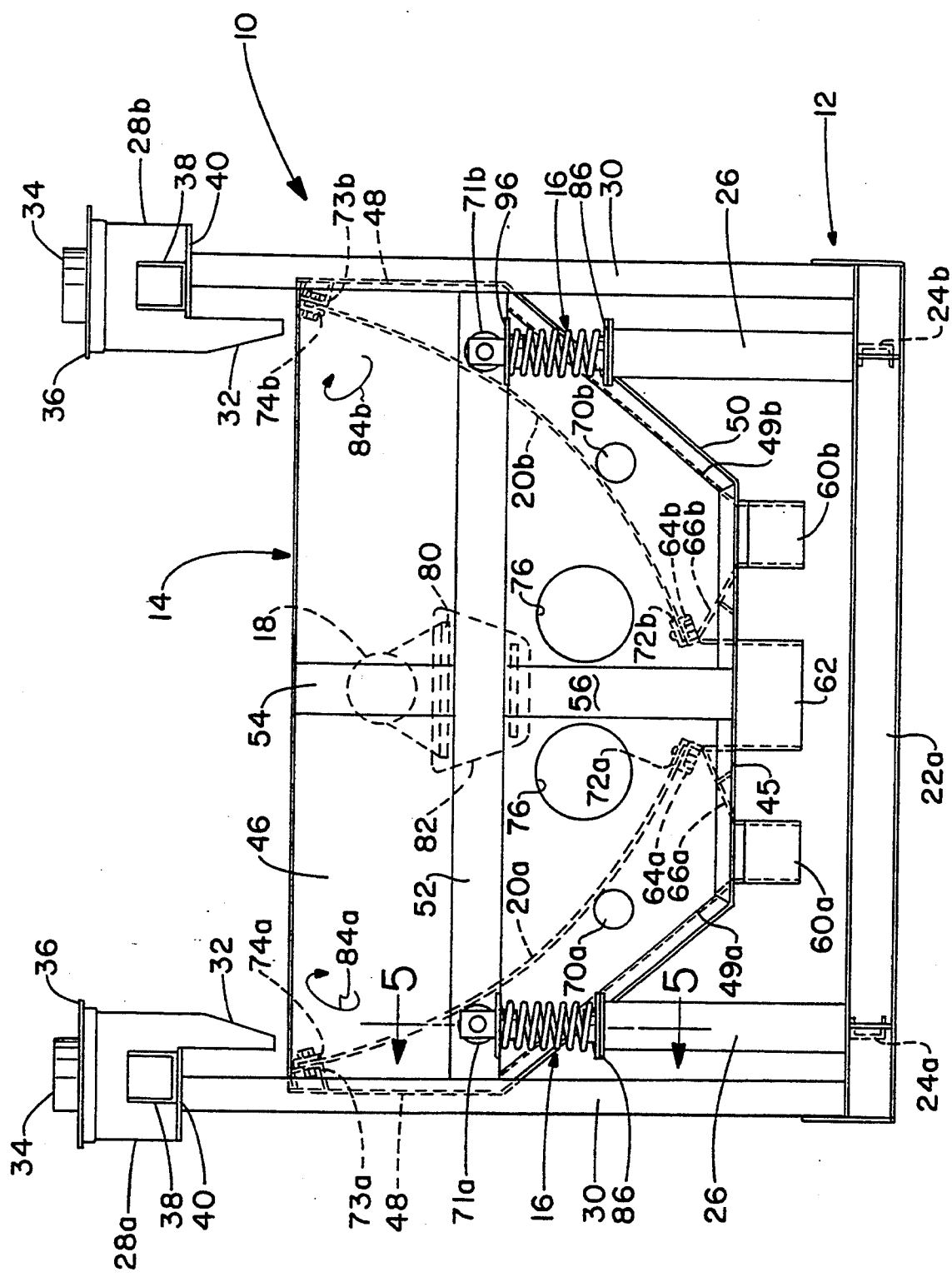
FIG. 3 is an elevational end view of the apparatus.

The improved wet screening apparatus of the present invention 10 includes a frame 12, a screen box 14, a plurality of suspension assemblies 16 for movably suspending the screen box on the frame for vibrating motion, a vibrator motor 18 for vibrating the screen box, and a pair of screens 20a and 20b.

The frame 12 includes a pair of longitudinal base members 22a and 22b which are connected together by transverse members 24a and 24b to form a rigid rectangular base. The longitudinal base members 22a and 22b are preferably I-beams. The transverse members 24a and 24b are preferably channel members which are preferably welded at their ends to the longitudinal base members, however, other suitable connecting means such as bolts can be used. Four vertical posts 26 connected as by welding to the rectangular base at each of its corners movably supports the screen box by means of intervening suspension assemblies 16.

A pair of substantially identical feed boxes 28a and 28b, each of which is associated with a corresponding screen 20a and 20b, respectively, are transversely supported above opposite ends of the screen box 14 by vertical support members 30 connected to the rectangular base of frame 12. The feed boxes 28a and 28b have a generally right parallelepiped shape with a length approximately equal to the width of the screens 20a and 20b. The feed boxes each have a downwardly depending feed chute 32 which extends substantially along the length of the feed box and over the entire width of the screen. The feed chutes 32 are relatively narrow compared to the width of the feed box and taper in width moving downwardly toward a rectangular discharge opening from which material to be separated is deposited approximately uniformly along the width of the respective screens 20a and 20b. Material to be separated enters the feed boxes through conduit means (not shown) in fluid communication with the feed boxes via feed ports 34. The feed boxes are preferably formed by bending and welding operations to form watertight seams. The top 36 of each feed box is preferably fastened as by bolts to a peripheral flange at the top of each feed box to allow for cleaning and/or unclogging of the feed boxes and discharge chutes. Brackets 38 welded at the lateral ends of the feed boxes are provided for mounting the feed boxes to support plates 40 welded at the top of support members 30. The feed boxes 28a and 28b are preferably mounted to the support plates by means of threaded fasteners to facilitate easy removal of the feed boxes from the frame 12. Channel braces 42 and transverse channel members 44 are provided to improve the rigidity and structural stability of the frame 12 and particularly to strengthen the support members 30.

The screen box 14 has a generally truncated or semi-octagonal prism shape with a rectangular top opening, a generally rectangular bottom 45 of reduced length, a pair of opposed truncated or semi-octagonal longitudinal side panels 46, a pair of opposed vertical end walls 48 and a pair of inclined panels 49a and 49b connecting the vertical end walls with the bottom. The side panels 46 generally consist of a metal sheet 48 welded to an outer peripheral framework 50 formed of angle irons which are welded together at their ends and which form an outwardly directed peripheral flange. A horizontal channel member 52 is welded to each of the side panels 46 to stiffen the panel and to serve as a support structure for movably connecting the screen box 14 to the frame 12 via the suspension assemblies 16. A pair of centrally positioned vertical channel members 54 and 56 are welded on each side of the horizontal member to the panel to provide additional rigidity. Upper transverse channel members 58 and lower vertical end walls 48 are welded to the side panels 46 to connect them together The bottom 45 and inclined panels 49a and 49b are welded to the side panels 46 to form a generally watertight path for directing liquids and undersize particles which pass through the screens to respective underflow discharge chutes 60a and 60b at or near the bottom of the screen box, each underflow discharge chute associated with one of the respective screens. A generally rectangular box shaped discharge chute 62 is centrally located between the bottom or discharge ends of the screens to direct oversize particles downward through the bottom of the apparatus. The top edges of the longitudinal walls of the discharge chute 62 protrude upward through the bottom of the screen box and are welded to channel members 64a and 64b, respectively, which are attached at their ends to side panels 46. Short inclined floor sections 66a and 66b are also welded to channel members 64a and 64b, respectively, to direct material through discharge openings 60a and 60b and to prevent pooling of liquid and undersize particles at the bottom of the screen box. The inclined panels 49a and 49b are preferably provided with a plurality of stiffening ribs 68 which strengthen the screen box and help bear the load of the liquid and undersize particles flowing over the panels 49a and 49b.

The screens 20a and 20b are preferably made of a metal such as stainless steel and consist of a set of thin, closely spaced, wedged shaped parallel bars or grates whose longitudinal direction coincides with the longitudinal direction of the apparatus, generally along the flow path of the material passing over the screens. The wedge shaped bars or grates are orientated with the flat end of the wedges facing generally upwardly toward the material passing over the screen, and are held apart by relatively widely spaced spacer bars positioned on the underside of the screen and whose longitudinal direction is transverse to the wedge-shaped bars.

Each of the screens 20a and 20b is preferably supported by a lower transverse suspension pipe 70a and 70b, respectively, and by an upper transverse suspension pipe 71a and 71b, respectively. The suspension pipes 70a, 70b, 71a and 71b are attached, as by welding, to the sides of the screen box 14. Each of the screens is secured at its discharge or bottom end to channel members 64a and 64b, respectively, by means of a clamp bar 72a and 72b having a plurality of holes for allowing threaded fasteners to pass therethrough and into threaded holes provided in channel members 64a and 64b. Similarly, each of the screens is secured at its leading or top end to channel members 73a and 73b, respectively, by means of a clamp bar 74a and 74b, having a plurality of holes for allowing threaded fasteners to pass therethrough and into threaded holes provided in channel members 73a and 73b. The clamp bars 72a, 72b, 74a and 74b facilitate easy installation, removal and replacement.

In accordance with the preferred embodiment, the screens are preferably arcuate and have a generally continuously decreasing slope moving from the leading end toward the discharge end of each screen, such that the material to be separated initially contacts the screen at a direction which is nearly parallel to the plane of the leading end portion of the screen, thus improving separation efficiency. Suitable screens generally include those within the range from about 4 mesh to about 200 mesh.

The screen box is preferably provided with a plurality of access holes 76 which allows maintenance personnel to reach inside the screen box to remove or loosen the fasteners used to attach the lower end of the screens to the channel members 64a and 64b to further facilitate easy installation, removal and replacement of the screens, as well as to facilitate cleaning and inspection of the screens.

Motor 18 is mounted on motor base member 80, which is mounted on brackets 82 attached to the inside walls of side panels 46. The motor is centrally positioned above and between the screens with the shaft of the motor positioned horizontally and extending transversely with respect to the longitudinal direction of the apparatus (i.e. transverse to the direction of flow of the material to be separated). Motor 18 is of the type which is well-known in the sizing equipment art, and transmits a high frequency, high gravitational force, and a generally vertical elliptical vibrating motion to screen box 14 and hence to screens 20a and 20b, as indicated by arrows 84a and 84b. An example of a suitable motor which could be used is the rotary electric vibrator motor. The gravitational force transmitted to the screens by the motor is generally within a range of from about 6 to about 9 Gs.

Screen box 14 is movably suspended on frame 12 by a plurality of suspension assemblies 16. The suspension assemblies 16 each include a bottom spring pad 86 which is removably mounted at the top of each of the vertical posts 26 by threaded fasteners. The pair of transverse suspension pipes 71 and 71b which extend between and are mounted in aligned pairs of openings formed in the side panels 46 have an end cap 90 formed with a central opening 92 mounted within each end of the suspension pipes. An axle 94 is mounted within opening 92 and extends outwardly therefrom. A top spring pad 96 is mounted on the outer end of each axle 94 and is vertically aligned with its respective bottom spring pad. Each top spring pad 96 is formed with a vertically extending axle block 98. A horizontal opening 100 is formed in axle block 98 for receiving the outer end of axle 94 to mount top spring pad 96 on the axle. A coil spring 102 is removably captured between each aligned pair of top and bottom spring pads, 96 and 86, for securely movably suspending screen box 14 on frame 12.

In operation and use, the screening apparatus is supplied with a liquid or wet feed stream by conduit means connected to feed ports 34 above feed boxes 28a and 28b. The flow rates of the two feed streams is preferably about equal to allow for the maximum separation efficiently at the greatest possible flow rate. The feed passes through the feed boxes and down the feed chutes 32 where the feed is substantially uniformly dispersed across the width of the screens 20a and 20b. The feed passes over the vibrating Screens whereupon the liquids and undersize or fine particles pass through the screen and onto the inclined panels 49. The liquids and fire particles then flow down the inclined panels 49a and 49b and are directed out of the apparatus through discharge openings 60a and 60b. The oversize or coarse particles pass over the screens 20a and 20b and are discharged from the apparatus through a single centrally positioned discharge chute 62.

While in accordance with the Patent Statutes, the best mode and preferred embodiment has been set forth, the scope of the invention is not limited thereto, but rather by the scope of the attached claims.

What is claimed is:

1. An apparatus for separating course particles from a fluid or wet stream, optionally containing fine particles, the apparatus comprising:
   a frame;
   a screen box having opposing ends;
   means attached to the frame and to the screen box for movably suspending the screen box on the frame for vibrating motion;
   a pair of laterally disposed screens mounted to the screen box, each screen having an elevated leading end near one of said opposing ends of the screen box, and each screen having a lowered discharge end near a central region of the screen box intermediate between said opposing ends of the screen box, whereby liquids and fine particles deposited onto each of the screens near said opposing ends of the screen box pass through the screens and coarse particles deposited on each of the screens near said opposing ends of the screen box pass over the screens and downwardly towards said central region of the screen box intermediate between said opposing ends of the screen box; and
   motor means attached to the screen box for vibrating the screen box and screens mounted thereto.

2. The apparatus of claim 1, further comprising a pair of feed boxes mounted at opposite ends of the frame and each supported above the leading end of one of the screens, the feed boxes each having a downwardly depending feed chute which extends substantially over the entire width of the screen so that material to the separated is deposited approximately uniformly along the width of the screens.

3. The apparatus of claim 2, further comprising a pair of discharge chutes located near the bottom of the screen box, each discharge chute being associated with one of the screens, and allowing for the liquids and fine particles, if any, to flow out of the apparatus.

4. The apparatus of claim 3, further comprising a single centrally positioned discharge chute for allowing the coarse particles passing over the screens to be discharged from the apparatus.

5. The apparatus of claim 4, wherein the screens consist of a set of thin, closely spaced, metal parallel grates whose longitudinal direction generally coincides with the flow path of the material passing over the screens, and which are connected to, and held apart by, spacer bars transverse to the grates.

6. The apparatus of claim 5, wherein each of the screens is arcuate and has a generally decreasing slope moving from the leading end of the screen toward the discharge end of each screen, such that the material to be separated initially contacts the screens at a direction which is nearly parallel to the plane of the leading end portion of the screen.

7. The apparatus of claim 6, wherein a plurality of access holes are provided to further facilitate easy installation, removal and replacement of the screens.

8. The apparatus of claim 7, wherein the motor means is mounted to the screen box and is centrally positioned above the screens.

9. The apparatus of claim 8, wherein the shaft of the motor means is positioned horizontally and extends transversely with respect to the longitudinal direction of the apparatus.

10. The apparatus of claim 9, wherein the motor means transmits a high frequency, high gravitational force, and a generally vertical elliptical vibrating motion to the screen box.

11. The apparatus of claim 10, wherein the gravitational force transmitted to the screens by the motor is generally within a range of from about 6 to about 9 Gs.

12. The apparatus of claim 11, wherein the screens have a mesh size of from about 4 to about 200.

13. An apparatus for separating coarse particles from a fluid or wet stream, optionally containing fine particles, the apparatus comprising:
    a frame;
    a screen box;
    a plurality of suspension assemblies attached to the frame and to the screen box for movably suspending the screen box on the frame for vibrating motion, each suspension assembly including a top spring pad attached to the screen box, a bottom spring pad attached to the frame and vertically aligned with the top spring pad, and a coil spring removably captured between each set of aligned top and bottom spring pads;
    a pair of screens mounted to, and laterally disposed at, opposite ends of the screen box, such that liquids and fine particles deposited onto each of the screens near the opposite ends of the screen box pass through the screens, and such that coarse particles deposited on each of the screens near the opposite ends of the screen box pass over the screens and downwardly toward a single control portion near the bottom of the screen box;
    a pair of feed boxes mounted at opposite ends of the frame, each of the feed boxes being supported above the leading end of one of the screens, the feed boxes each having a downwardly depending feed chute which extends substantially over the entire width of the screen so that material to be separated is deposited approximately uniformly along the width of the screens;
    a pair of discharge chutes located near the bottom of the screen box, each discharge chute being associated with one of the screens and allowing for the liquids and fine particles, if any, to flow out of the apparatus;
    a single centrally positioned discharge chute for allowing the boards particles passing over the screens to be discharged from the apparatus; and
    motor means attached to the screen box for vibrating the screen box and screens mounted thereto.

14. The apparatus of claim 13, wherein the screens consist of a set of thin, closely spaced, metal parallel grates whose longitudinal direction generally coincides with the flow path of the material passing over the screens, and which are connected to, and held apart by, spacer bars transverse to the grates.

15. The apparatus of claim 13, wherein each of the screens is arcuate and has a generally decreasing slope moving from the leading end of the screen toward the discharge end of each screen, such that the material to be separated initially contacts the screens at a direction which is nearly parallel to the plane of the leading end portion of the screen.

16. The apparatus of claim 14, wherein a plurality of access holes are provided to further facilitate easy installation, removal and replacement of the screens.

17. The apparatus of claim 16, wherein the motor means is mounted to the screen box and is centrally positioned above the screens.

18. The apparatus of claim 17, wherein the shaft of the motor means is positioned horizontally and extends transversely with respect to the longitudinal direction of the apparatus.

19. The apparatus of claim 18, wherein the motor means transmits a high frequency, high gravitational force, and a generally vertical elliptical vibrating motion to the screen box, and wherein the gravitational force transmitted to the screens by the motor is generally within a range of from about 6 to about 9 Gs.

20. The apparatus of claim 19, wherein the screens have a mesh size of from about 4 to about 200.

* * * * *